United States Patent [19]

Austin

[11] 4,076,207
[45] Feb. 28, 1978

[54] FOOD MOLD

[75] Inventor: Forrest L. Austin, Brooklyn Center, Minn.

[73] Assignee: The Cornelius Company, Minneapolis, Minn.

[21] Appl. No.: 578,526

[22] Filed: May 19, 1975

[51] Int. Cl.² ............................................ A23P 1/00
[52] U.S. Cl. ............................ 249/66 R; 249/112; 249/127; 425/437; 425/440; 249/134; 425/DIG. 44
[58] Field of Search ................... 249/66 R, 66 A, 74, 249/112–115, 127, 128, 134, 136–137, 125, 76; 425/437, 440, DIG. 44

[56] References Cited

U.S. PATENT DOCUMENTS

| 718,124 | 1/1903 | Heydt | 249/112 |
|---|---|---|---|
| 1,907,503 | 5/1933 | Chilton | 249/120 |
| 2,431,916 | 12/1947 | Caesar | 425/440 |
| 2,584,838 | 2/1952 | Boyle | 249/120 |
| 3,021,695 | 2/1962 | Voigtmann | 249/127 |
| 3,347,966 | 10/1967 | Seefluth | 425/437 |
| 3,483,908 | 12/1969 | Donovan | 249/66 |

FOREIGN PATENT DOCUMENTS

| 656,188 | 11/1964 | Belgium | 249/127 |
|---|---|---|---|
| 1,202,116 | 9/1965 | Germany | 425/134 |
| 6,407,514 | 1/1966 | Netherlands | 249/127 |
| 443,870 | 2/1968 | Switzerland | 425/437 |

*Primary Examiner*—Francis S. Husar
*Assistant Examiner*—William R. Briggs
*Attorney, Agent, or Firm*—Henry C. Kovar

[57] ABSTRACT

A food mold is disclosed which has a flexible sanitary liner and a rigid holder for the liner, the liner has a rim for securement to the holder and a cup shaped portion for forming food to a predetermined shape, the cup is flexibly and resiliently movable for discharge of food from the mold when the mold is turned upside down; the holder may include a finger actuatable valve for control of flow of air into a space between the liner and holder, for control of movement of the cup and release of the molded food product, and the liner may have a weight attached to the cup for automatically retracting the cup when the mold is turned from an inverted emptying to a normal upright filling position.

5 Claims, 3 Drawing Figures

UPWARD MOVEMENT OF MOLD FOR RELEASE OF FOOD

FOOD MOLD

BACKGROUND OF THE INVENTION

1. Field of the Invention

This invention pertains to a food mold having a flexible liner.

2. Prior Art

Food molds have previously been provided that are formed of flexible and resilient plastic, examples of which are ice cube trays and plastic bowls. These molds will release only a rigid molded food product, one of which is ice, and require manual deformation of the mold, usually with two hands, to release or eject the food product.

Another common previous food mold is a scoop, for removing food from a kettle. The scoop may form the food product to a shape and may also have a device to release the food, the usual device being a scraper blade which is actuated by the user.

Other prior food molds include metal molds, wherein the molded food product may be released by application of heat to the mold.

Another prior art food mold is typified by either a two piece pan having a center section removable from an outer section or a single piece pan with a wiper blade for cutting a molded food product from the pan.

The prior art food molds are typified by requiring some type of manipulation for release of molded food product and they then usually require cleaning of residual food product left on the mold surfaces before the next use. The prior art food molds are typically provided with features for releasing a firm solid food product but cannot release a semi-firm, sticky or semi-fluid product in a predetermined shape.

SUMMARY OF THE INVENTION

In accordance with this invention, a food mold is provided having a liner with a central cup of sanitary flexible material and a rim for attaching the liner to a holder, a rigid holder to which the liner is attached; the mold being invertible for release of a molded food product by deformation of the liner from the weight of the food product within the liner; distinct features of the invention include a weight mounted in and movable with a liner cup bottom for retracting the liner cup into the holder, and a finger actuatable air valve in the holder for controlling deformation of the liner and release of molded food product.

Accordingly, it is the object of the present invention to provide a sanitary food mold which will release molded food when the mold is inverted.

Another object of the present invention is to provide a food mold which will mold a soft food to a predetermined shape and release the product in the predetermined shape.

A further object of the present invention is to provide a food mold from which release of food product is easily controllable.

Yet another object of the present invention is to provide a food mold which will release food product by flexing and automatically return to a predetermined shape.

Another object of the present invention is to provide a food mold which is sanitary and is easily disassembled for cleaning and easily reassembled for use after cleaning.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
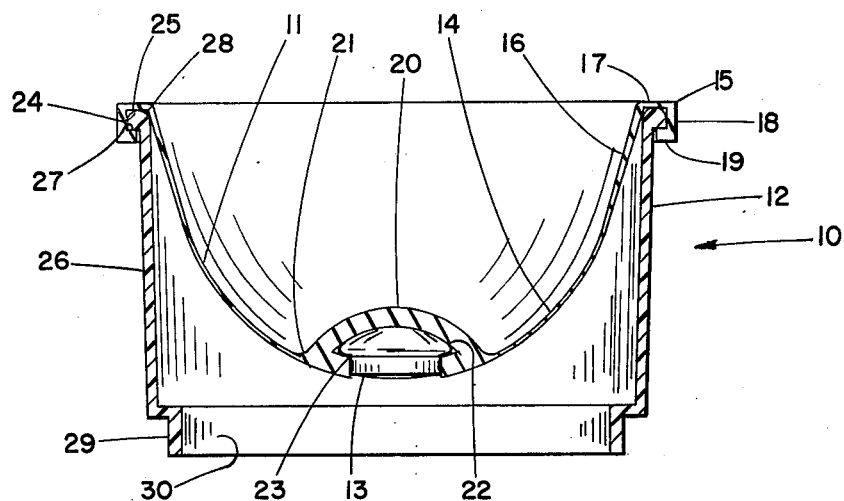
FIG. 1 is a vertical cross sectional view of a food mold provided in accordance with the principles of the present invention.

The principles of the present invention are particularly useful when embodied in a food mold of the type illustrated in FIG. 1 and generally indicated by the numeral 10. The mold 10 includes a liner 11, a holder 12, and may have a weight 13 mounted in liner 11.

The liner 11 is made of a flexible, resilient elastomer. Liner 11 has a central cup portion 14 for receiving food product to be molded and a rim 15 for securement of the liner 11 to the holder 12.

The cup 14 is formed of thin elastomeric film, preferably molded silicone rubber in the range of 0.2 to 0.5 millimeters thick at the thinnest part, and is freely flexible. As shown in FIG. 1, the cup 14 has a generally hemi-spherical shaped bottom from which a circumferential side extends upwardly and may have an outwardly divergent frusto-conical section 16 between the bottom of cup 14 and the rim 15.

The rim 15 includes a flexible annular flange 17 which extends radially outward from around the top of cup 14. At the outer diameter of flange 17, there is a tubular ring 18 which extends perpendicularly to the flange 17 and extends from the flange 17 in the same direction as the cup 14. At one end of the ring 18, there is an annular lip 19 which is spaced from the flange 17 and is shown facing inward toward the cup 14 forming an undercut pocket in the rim 15 for securement of the liner 11 to the holder 12.

At the bottom of liner cup 14, there is an inward extending protuberance 20 for forming a depression in a molded food product and for another use which will be later explained. The protuberance may have a convex, generally hemi-spherical shape as is shown in FIG. 1, and there is a fillet 21 which provides a smooth, gradual blending between the protuberance 20 and the cup 14 section. The protuberance 20 extends toward the rim 15 from the bottom of cup 14 as is shown in FIG. 1.

The weight 13 is attached to liner 11 at the bottom of cup 14. At the bottom of cup 14 there is a cage 22 formed by an undercut cavity molded integrally in the liner 11. The weight 13 is preferably of metal and has a shoulder 23 which is of larger cross section than the opening into cage 22. The portion of the cup 14 forming the cage 22 is resiliently flexible only to the extent that it can be deformed for insertion or removal of the weight 13; the cage 22 resiliently retains its normal molded shape to frictionally retain the weight 13 internally.

As shown in FIG. 1, the weight 13 may be caged within the protuberance 20.

The holder 12 is formed of a rigid material such as molded plastic, and has a collar 24 to which the liner 11 is attached. The collar 24 has a top surface 25 against which the annular flange 17, of the rim 15, bears. The collar 24 extends outward from main body 26 of holder 12 and has an annular step 27 facing downward against the lip 19 of liner 11. The inner circumferential edge 28 of the collar 24 is rounded to present a smooth load bearing edge against the liner 11, where the cup 14 and annular flange 17 meet to support the cup when filled with product without tending to cut the cup. The rim 15 is flexible to the extent that it may be easily rolled over the collar 24 for attachment or removal of the liner 11 to the holder 12 and resilient for returning to the as-molded shape for enclosing the collar 24 and retaining the liner 11 to the holder 12.

The main body of the holder 12 forms a handle for grasping and manipulation of the food mold 10, without distortion of the liner 11 or any food product within the liner 11. At the bottom of holder 12, there is a pilot surface 29 for registering the food mold in automatic filling equipment (not shown). Although the size of the holder 12 atop the pilot 29 and the liner 11 may vary according to quantity of serving, the pilot 29 remains of a predetermined size for registry with a dispensing station in automatic filling equipment (not shown).

There is a passageway 30 in the holder 12 for flow of air into or out of the space between the liner 11 and the holder 12; this air flow is required in order that the liner cup 14 be able to move up and down in the mold 10 as will be described later. As shown in FIG. 1, the passageway 30 is the opening in the bottom of holder 12.

The material, form and thickness of the liner 11 have been found to have advantageous physical ranges. The material of liner 11 is preferably a molded, sanitary food grade silicone rubber which has flexibility and resistance to tearing during flexing. The thickness of the various portions of the liner 11 have been found to have optimum physical sizes or ratios to other portions. The thickness of the cup portion 14 has an optimum minimum thickness of 0.2 to 0.5 millimeters around the bottom and in the hemi-spherical portion, as the cup 14 extends upward into the frusto-conical section 16, or approaches the rim 15, it has been found advantageous to gradually blend and increase the material thickness of liner 11 to a thickness range of one to three times the minimum thickness of the cup portion; this thickness being 0.2 to 0.6 millimeter. The thickness of the annular flange 17 has been found to be optimal at a ratio of one to three times the thickness of the minimum thickness cup portion 14, or to have a thickness of 0.2 to 0.6 millimeter. The thickness of the tubular ring 18 has been found to be optimal at about 3 times the thickness of the annular flange 17, or to have a thickness of about 1.5 millimeter. The thickness of the annular lip 19 has been found to be optimal when thicker than the tubular ring 18 or to be about 2.5 millimeters. The thickness of the section forming the cage 22 has been found to be preferably 3 millimeters or more, and to be less flexible than the rest of the liner cup 14.

These criteria of material, thickness and thickness ratios give the proper flexibility for operation of the liner 11 and the individual portions of the liner 11 as will be later explained.

Figure 2:
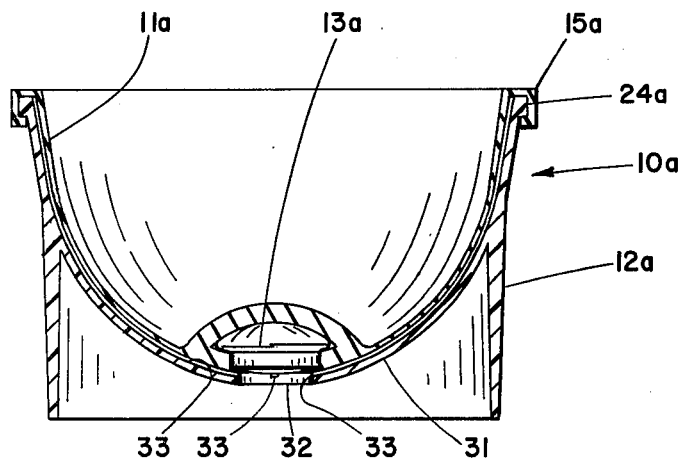
FIG. 2 is a vertical cross sectional view of a modified food mold, in accordance with the principles of the present invention.

Referring to FIG. 2, a modified food mold, generally indicated by the numeral 10a is shown, which has a liner 11a, a holder 12a and a weight 13a. The liner 11a and weight 13a are identical respectively to the liner 11 and weight 13 shown in FIG. 1. The holder 12a provides features for control of release of molded food product from the mold 10a when inverted.

Holder 12a has a rigid web 31 encircling the underside of liner 11a; web 31 may be molded integrally with holder 12a and may serve to support liner 11a when filled with food product. The web 31 is sized and positioned to minimize any air space between itself and the liner 11a. The rim 15a of liner 11a and the collar 24a of holder 12a are sized to provide an air tight seal where the liner 11a is secured to the holder 12a.

At the bottom of web 31, there is provided a normally open valve 32 for control of flow of air into or from any space between web 31 and liner 11a. In the embodiment shown, the valve 32 is an aperture in web 31 which is sized to be coverable by a human finger for closing of the valve.

There may be one or more air vents 33 which extend between the liner 11a and the holder 12a from the valve 32 to the top of holder 12a or the level of the rim 15a for preventing air lock of the liner 11a to the holder 12a. The valve 32 may alternately be located in the sidewall of holder 12a and be externally accessible (not shown).

In operation, the mold 10 is filled with food product in a free flowing usually liquid state, to a level below the top of the liner 11. The free flowing food product is then congealed or solidified to the shape of the liner 11 inner profile by use of well known gelling additives in the food product or by heat transfer or other means. The mold 10 is then manually grasped by the rigid holder 12 and inverted to an upside down position for release of food product. The embodiment of food mold 10 shown in FIG. 1 must immediately be placed when inverted, against a surface upon which the food product is to be deposited. The modified embodiment of the food mold 10a, as shown in FIG. 2, enables the user to place a finger of the hand grasping the mold over the valve 32 and to retain the food product in the mold by establishing an air tight seal between the holder 12a and liner 11a, which seal retains the liner 11a in its normal position, even when inverted with food product in the liner 11a, by the atmospheric air pressure against the exposed side of the liner 11a and the molded food product. The user can then maintain the filled mold 10a in an upside down position for as long as desired and place the mold 10a precisely against or over a surface upon which the food product is to be deposited, before opening the valve 32 by removal of the finger, for release of molded food product from the mold 11a.

Figure 3:
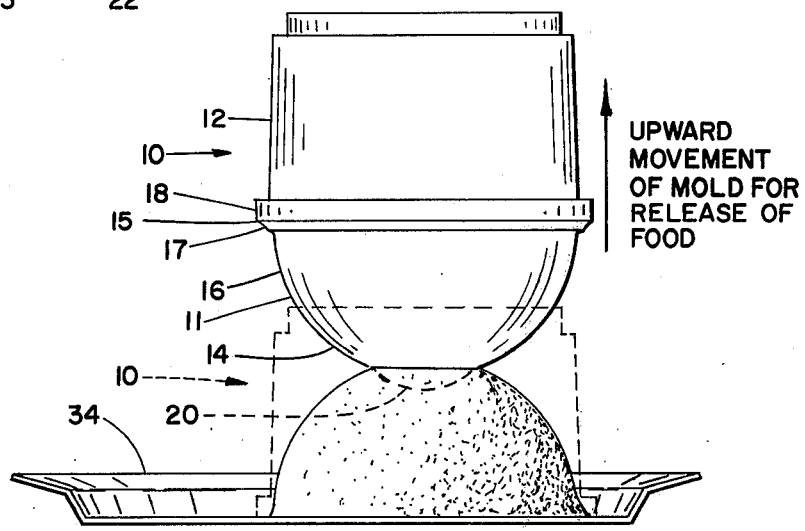
FIG. 3 is a vertical view of the food mold of FIG. 1, shown inverted with the liner extended outward, and releasing a molded food product upon a plate which is shown in section; a release starting position of the mold being shown in dotted lines.

When the inverted mold 10 is placed against a surface, such as plate 34 as is shown in FIG. 3, the mold 10 is initially in the position shown in dotted lines with the annular flange 17 bearing against plate 34. The molded food product within the mold 10 drops against the plate 34 and usually sticks to the plate 34. To leave the food product on the plate 34, the food mold 10 is withdrawn upward off of the food product and during this withdrawal, the liner 11, under the weight and downward pull of the molded food product, flexes toward and even through the rim 15, gradually peeling off of the molded food product.

As the mold 10 is withdrawn upward, the liner 11 flexes initially in the area of the annular flange 17. The annular flange 17 flexes downward from the tubular ring 18 on the order of a belleville washer and assumes the form shown in FIG. 3. As the mold 10 is raised further, the liner cup 14 flexes and rolls while peeling off of the surface of the molded food product until the form shown in solid lines in FIG. 3 is reached. Upon further raising of the mold, the protuberance 20 pops out of the depression formed in what is now the top of the molded food product. The released molded food product is shaped virtually exactly like the internal form of the liner 11.

After the mold 10 is free of the molded food product, the mold is turned over to the normal upright facing position and the weight 13 automatically retracts and returns the liner 11 to the normal form and position shown in FIG. 1.

A specific use of the mold 10 is in the serving of a predetermined portion of instant mashed potatoes. The potato powder and water are mixed and poured into the mold 10, the potatoes gel or set to a semi-rigid state, the mold 10 is inverted and placed against a plate 34, the mold is raised releasing the potatoes, and then turned over, whereupon the weight 13 returns the liner 11 to the normal position. The serving of potato is attractively formed, of a precise quantity, and has a depression in the top for gravy or butter.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A mold liner for molding food to a predetermined shape comprising:
   (a) a cup having a flexible bottom and side formed of elastomeric film, an open end, and a sanitary inner concave surface forming a predetermined normal cup shape for receiving food product therein;
   (b) a rim attached to and circumferentially about the open end of the cup;
   (c) securement means on the rim for securing the cup to a rigid holder;
   (d) a resiliently and flexibly deformable weight retaining cage formed by an undercut cavity in the bottom and open to the bottom side of the liner, said cage receiving and retaining a weight in the bottom of the liner and being flexibly and resiliently deformable for insertion thereinto and removal therefrom of the weight;

the bottom of the cup and the cage both being resiliently movable toward the rim by resilient flexing of the cup side for discharge of a food product molded to the predetermined normal cup shape.

2. A mold liner according to claim 1, in which the cage forms a protuberance extending into the cup and toward the rim for forming a depression in a molded food product, said undercut cavity being within said protuberance for caging the weight within the protuberance.

3. A food mold comprising:
   (a) a liner having
      (1) a cup formed of a film of sanitary and flexible material,
      (2) a rim extending around an open end of the cup, and
      (3) a cup bottom which is flexibly and resiliently movable toward the rim;
   (b) a weight attached to the bottom of the cup, the weight being comovable together with the cup bottom, said weight having a mass sufficient for pulling the bottom of the cup under the force of gravity downwardly from a level near the rim to a lower level for returning the liner cup to a normal form after discharge of molded food product from the cup; and
   (c) a rigid liner holder having means securing the liner to the holder rim, the mold being invertable from a normal position with the liner facing upward for filling to an upside down emptying position in which the cup bottom is freely downwardly flexibly movable under the downward gravitational pull of molded food product for release of such food product from the mold, the weight being gravitationally operable for retracting the cup bottom back to a normal position upon subsequent inversion of the mold to its normal upright position for refilling.

4. A food mold according to claim 3, in which the bottom of the cup has a cage formed by an undercut cavity which is an integral part of the liner, said cage forming a protuberance extending into the liner cup with the weight being enclosed and caged within the protuberance.

5. A food mold according to claim 3, in which the portion of the cup forming the cage is resiliently deformably flexible for manual insertion and removal of the weight.

* * * * *